(12) United States Patent
Hartig et al.

(10) Patent No.: US 9,753,971 B2
(45) Date of Patent: Sep. 5, 2017

(54) HOT DEPLOYMENT OF EMBEDDED DATABASE PROCEDURES

(71) Applicants: Martin Hartig, Walldorf (DE); Helmut Prestel, Bad Schoenborn (DE); Rolf Hammer, Walldorf (DE); Kai Baumgarten, Walldorf (DE); Sigrid Wortmann, Walldorf (DE); Christiane Kettschau, Walldorf (DE); Stefan Werner, Hamburg (DE); Ralf Wendelgass, Walldorf (DE)

(72) Inventors: Martin Hartig, Walldorf (DE); Helmut Prestel, Bad Schoenborn (DE); Rolf Hammer, Walldorf (DE); Kai Baumgarten, Walldorf (DE); Sigrid Wortmann, Walldorf (DE); Christiane Kettschau, Walldorf (DE); Stefan Werner, Hamburg (DE); Ralf Wendelgass, Walldorf (DE)

(73) Assignee: SAP SE, Walldorf (DE)

( * ) Notice: Subject to any disclaimer, the term of this patent is extended or adjusted under 35 U.S.C. 154(b) by 442 days.

(21) Appl. No.: 14/548,574

(22) Filed: Nov. 20, 2014

(65) Prior Publication Data
US 2016/0078041 A1 Mar. 17, 2016

Related U.S. Application Data

(60) Provisional application No. 62/050,511, filed on Sep. 15, 2014.

(51) Int. Cl.
*G06F 17/30* (2006.01)
*G06F 9/445* (2006.01)

(52) U.S. Cl.
CPC .......... *G06F 17/30386* (2013.01); *G06F 8/67* (2013.01); *G06F 9/44521* (2013.01); *G06F 17/30289* (2013.01); *G06F 17/30297* (2013.01)

(58) Field of Classification Search
CPC ......... G06F 17/30386; G06F 17/30289; G06F 17/30297; G06F 8/67; G06F 9/44521
See application file for complete search history.

(56) References Cited

U.S. PATENT DOCUMENTS

2014/0207851 A1\* 7/2014 Qu .......................... G06F 9/541
709/203
2016/0078067 A1\* 3/2016 Hartig ............... G06F 17/30297
707/803

\* cited by examiner

*Primary Examiner* — Jay Morrison
(74) *Attorney, Agent, or Firm* — Schwegman Lundberg & Woessner, P.A.

(57) ABSTRACT

Disclosed herein are systems and methods for the hot deployment of database procedures embedded in a host software application. In various example embodiments, the database procedures are encapsulated in specially marked methods of the host application, which, when called at runtime, cause the database procedures, and associated procedure stubs through which the database procedures are called, to be created in a database catalog and executed on the database server. When an embedded database procedure is modified in an application by one user during execution of that application by a second user, compilation of the modified database procedure may result in deletion of the original database procedure and/or associated procedure stub from the database, avoiding inconsistencies between database procedure versions during application execution by the second user.

21 Claims, 7 Drawing Sheets

```
METHOD MY_DB_PROC

BY DATABASE PROCEDURE

FOR DATABASE <db-type>

[LANGUAGE <db language>]

USING TABLE|VIEW|METHOD <name>.

"" native SQLScript here

ENDMETHOD.
```

FIG. 3

```
class ZCL_MH_AMDP_TEST definition.
class-methods TEST_2
    importing value(p_1) type tt_my_t100
    exporting value(p_2) type tt_my_t100.

endclass.

class ZCL_MH_AMDP_TEST implementation.
   method TEST_2 BY DATABASE PROCEDURE
      FOR HDB LANGUAGE SQLSCRIPT
      options READ-ONLY.
      p_2 = SELECT * FROM :p_1.
   endmethod.
endclass.
```

FIG. 4A

```
create procedure
"ZCL_MH_AMDP_TEST=>TEST_2"
(
in    "P_1" "ZCL_MH_AMDP_TEST=>TEST_2=>P_1#tft",
out   "P_2" "ZCL_MH_AMDP_TEST=>TEST_2=>P_2#tft"
)
language sqlscript  sql security invoker reads sql data as
begin
p_2 = SELECT * FROM :p_1.
```

FIG. 4B

```
create procedure
 "ZCL_MH_AMDP_TEST=>TEST_2#stub#20130906164242"
language sqlscript sql security invoker  reads sql data  as
begin
    call "ZCL_MH_AMDP_TEST=>TEST_2"(
       "P_1" => :P_1,
       "P_2" => :P_2
    );
end;
```

HOT DEPLOYMENT OF EMBEDDED DATABASE PROCEDURES

CROSS-REFERENCE TO RELATED APPLICATION

This application claims priority to and the benefit of U.S. Provisional Patent Application No. 62/050,511, filed on Sep. 15, 2014, which is hereby incorporated herein by reference in its entirety.

TECHNICAL FIELD

This document relates generally to systems and methods for accessing databases, for example, methods and systems that facilitate hot deployment of database procedures embedded in database-accessing programs.

BACKGROUND

Many businesses and other enterprises nowadays store vast amounts of data in databases, often using commercially available database platforms in conjunction with software applications capable of accessing and processing the data to extract meaningful information therefrom in support of various business processes. For example, software applications for enterprise resource planning, customer relationship management, supplier relationship management, supply chain management, and product lifecycle management are widely used across many industries. In many deployment scenarios, such software applications are centrally executed on an application server (integrated or in communication with the database platform) that may be accessed by users, for example, via web portals. Many different instances of the same application may run simultaneously, each within a respective user session.

Existing software applications may be modified from time to time by a developer to adjust them to changing business needs, correct errors found during use, or improve user experience, among other reasons. With widely used applications, it is likely that, at the time the developer activates a new version of an application, the previous version of the same application is currently in use by one or more other users. In this situation, it is desirable that these users can complete execution of the old application version (or at least continue execution of the old application version until a stable state is reached, such as when data is saved), while other users freshly starting the application obtain immediate access to the new version. Similarly, in large development projects, multiple developers may implement changes to different (or even the same) parts of an application in parallel, and one developer may wish to deploy her modification without affecting the execution of previous versions of the applications that are in use by the other developers. Accordingly, in both scenarios, multiple different versions of the same application may be running in parallel over a certain time period (e.g., minutes, hours, or even days). It is important, during this period of version overlap, to avoid inconsistencies that may arise, for instance, if an established session switches inadvertently, and/or unbeknownst to the user, from the older version to the newer version. The activation of a new application version in a manner that is not, or only minimally, disruptive to the current execution of a previous version (hereinafter referred to as "hot deployment" of the new version) can generally be accomplished with a suitable "multi-version-capable" infrastructure that keeps track of the versions of executed applications.

With a growing need for real-time data access and increasing amounts of data, a trend has emerged to move data-processing functionality closer towards the database to reduce the frequency with which the database is accessed by external programs. This "code push-down" can be accomplished through the use of database procedures that are executed within the database itself. Database procedures, however, are limited in the types of operations they can perform. Furthermore, while databases are generally multi-version capable with respect to the data they store (allowing one user to update data in the database without affecting another user's access to the previous version of that data), this capability does not extend to database procedures. Accordingly, if changes to an existing software application involve modifications to one or more database procedures, inconsistencies can arise whenever the modification is deployed while an application utilizing the old database procedure version is still in use.

BRIEF DESCRIPTION OF THE DRAWINGS

The present disclosure illustrates embodiments of the invention by way of example and not limitation, and with reference to the following drawings.

DETAILED DESCRIPTION

The description that follows includes systems, methods, techniques, instruction sequences, and computing machine program products that embody illustrative example embodiments of the disclosure. For the purposes of explanation, numerous specific details are set forth in order to provide an understanding of various example embodiments of the inventive subject matter. It will be evident, however, to those skilled in the art, that example embodiments of the inventive subject matter may be practiced without these specific details. In general, well-known instruction instances, protocols, structures, and techniques have not been shown in detail.

In general, the subject matter disclosed herein relates to the integration of stored database procedures (herein also referred to as "database procedures" or "stored procedures") with or into a software application designed to access a database in order to retrieve data therefrom and/or store data therein, and/or to process the data, e.g., in accordance with a business process. In various example embodiments, the database is maintained on a database server, and the software application is created and executed on an application server in communication therewith. The database procedures are ultimately stored and executed in the database. Conventionally, the database-procedure source code may be defined on the database server as well (e.g., using a suitable code editor), and integrated with the application via separately created database-procedure proxies. By contrast, example embodiments described herein facilitate embedding database procedures directly in the application source code, despite the fact that, in general, the language in which the host application is written (hereinafter also referred to as the "host language") differs from that used to define the embedded database procedure(s). This capability may eliminate the need for the programmer to use different toolsets for developing the application and database procedures, providing a more seamless development experience.

Furthermore, some example embodiments hereof allow developers to modify an existing application, including database procedures embedded therein, in isolation, and facilitate the hot deployment of the modified application. The hot deployment of the embedded database procedures is supported by functionality for syntax checks prior to deployment, an infrastructure for proper version management, a mechanism for the lazy creation of database procedures, fault-tolerant runtime behavior, and dependency management within a directory of database procedures. More specifically, to manage multiple versions of database procedures properly and avoid and/or resolve version conflicts, version stubs may be used. The goal is to ensure that, within a user session, procedures run consistently with the same version. If a database procedure changes during the execution time of a session, this conflict is detected, and the session is aborted in order to avoid inconsistencies. Accordingly, in accordance with example embodiments, the invocation of a database procedure from within a host application happens via a procedure stub that is versioned, e.g., by including in its name the compilation timestamp for the application. Furthermore, it is ensured that only one version of the stub exists. The resulting behavior is that sessions that have been launched before a procedure version change will abort if the procedure is called again within this session.

Figure 1:
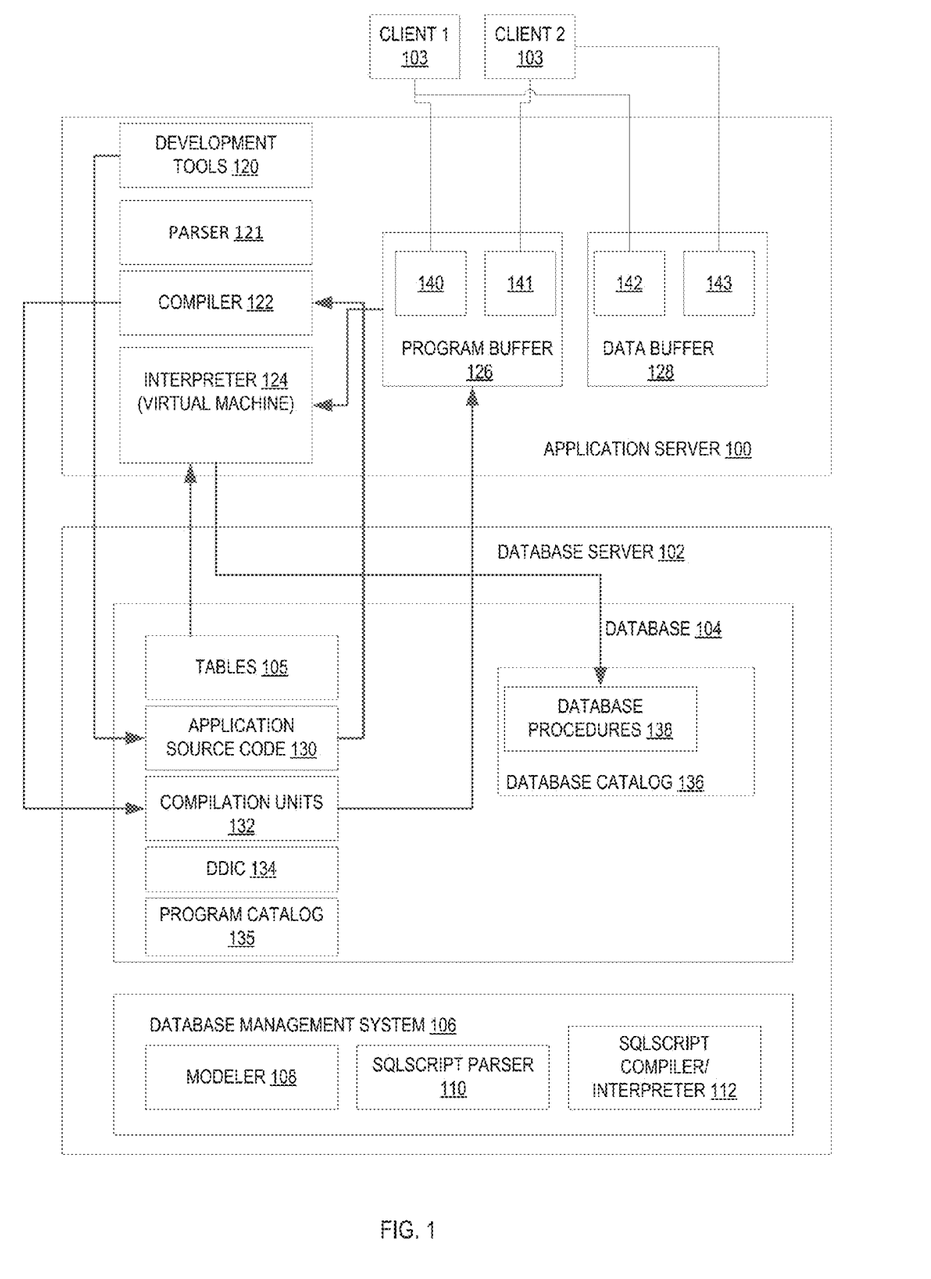
FIG. 1 is a block diagram illustrating a system, in accordance with an example embodiment, including application and database servers.

FIG. 1 is a block diagram illustrating a system, in accordance with an example embodiment, including application and database servers. The system is shown to include an application server 100 and a database server 102, which may be connected via a wired or wireless network (not shown). The same or another wired or wireless network may also allow users to connect to the application server 100 from respective client machines 103 (which may be or include, e.g., stand-alone computing devices including one or more processors and memory, or "dummy" terminals merely providing input/output capabilities). In the depicted example, only two client machines are shown. It will be readily understood, however, that the application server 100 can be simultaneously accessed by more than two users.

The server 100 may include software development tools 120, including, e.g., a code editor used to define the application source code as well as data types and data structures (including, e.g., scalars, tables, and views) used therein. Further, the server 100 may have a parser 121 that serves to check the code syntax and dependencies, and a compiler 122 that translates application source code into compilation units written in an intermediate language; in some example embodiments, the parser 121 and compiler 122 are integrated into one component. The application server 100 may also have an interpreter 124 that executes the compilation units (and which may be part of a virtual machine further providing related functionality), a program buffer 126 in which the compilation units are held during runtime, and a data buffer 128 in which frequently accessed and/or infrequently changed data may be temporarily stored to limit database accesses during execution of an application. When an application is executed simultaneously by multiple users, the program buffer 126 and the data buffer 128 may be configured to provide isolated buffer compartments 140, 141, 142, 143 for multiple respective user sessions. Alternatively, the program buffer may be shared among users that simultaneously execute the same version of the application, but if different versions of an application are simultaneously in use, the different version may be run in separate buffer compartments.

The database server 102 stores a database 104 (e.g., an in-memory database) that includes business data, generally organized in tables 105, as well as an associated database management system (DBMS) 106. The DBMS 106 may include various software programs that interact with users, other software applications, and the database 104; these programs may include, e.g., a modeler 108 (which may be used to define, e.g., tables, views, indexes, stored procedures, and other database objects), an SQLScript parser 110, and an SQLScript compiler or interpreter 112 (depending on the particular database). In various example embodiments, the database 104 may double as a repository for the application source code (storage module) 130, the compilation units (storage module 132), a data dictionary (DDIC) 134 that separately stores the data structures and types used in the application, and a program catalog 135 that stores metadata about the program objects (e.g., source code objects and compilation units). The database 104 further includes a database catalog 136 that stores metadata about the tables 105 (including their organization, available views, etc.) as well as the database procedures 138 and database procedure stubs 139 (or, in some example embodiments, more precisely descriptions of the database procedures 138 and stubs 139 that are a prerequisite for database-procedure/stub execution).

In various example embodiments, the application server 100 is an Advanced Business Application Programming (ABAP) application server that hosts one or more software applications written in the ABAP language developed by SAP SE (headquartered in Walldorf, Germany). (In ABAP, the compilation units are also referred to as "loads.") The database server 102 may provide, for example, the SAP-developed High-Performance Analytic Appliance (HANA™) database platform. HANA databases currently supports database procedures written either in SQLScript (which herein refers to an SQL-based scripting language developed by SAP for HANA) and LLANG (or "L," which is a database language developed by SAP for HANA that focuses on arithmetics and calculations rather than data access and manipulation, and has similarities to the C programming language). It is to be understood, of course, that the scope of the present disclosure is not limited to ABAP and HANA, but is also applicable to host applications and database procedures written in other programming languages, and to other types of application servers and database platforms (e.g., Oracle Database, IBM DB2, Microsoft SQLServer, or the like).

Figure 2:
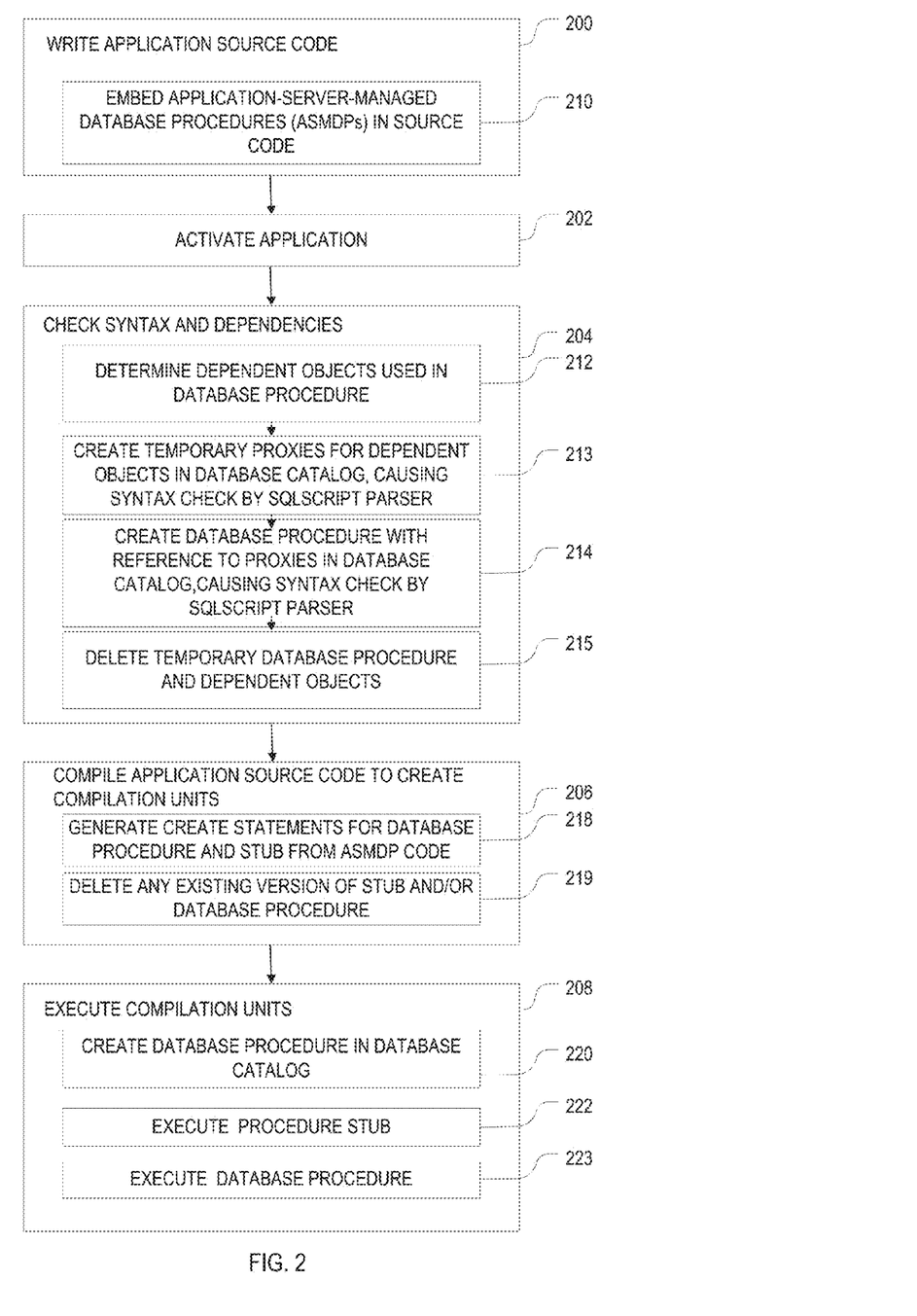
FIG. 2 is a flow chart illustrating a method, in accordance with an example embodiment, for creating and executing applications with embedded database procedures.

FIG. 2 is a flow chart illustrating a method, in accordance with an example embodiment, for creating and executing applications with embedded database procedures. The method may be deployed on the system of FIG. 1 and, accordingly, is described merely by way of example with reference thereto. To provide some context for the integration of database procedures into host applications in accordance herewith, consider first the general process of creating and executing a host application. The application source code may be written on the application server 100, using the development tools 120 available thereon (see operation 200). The application source code is typically (but not necessarily) stored in the database 104. An application under development may be stored as an inactive version. To deploy the application in practice, the developer activates the application as shown at operation 202. Only one active version can exist at a given point in time; accordingly, activating an application overwrites any previously activated version of that application (e.g., a program with the same name). As shown at operation 204, activation may trigger syntax and dependency checks, followed by compilation of the source code (see operation 206). The compilation units may be stored in the database 104 (in storage module 132). In some example embodiments, the compilation process is "lazy," meaning that dependent objects (such as other programs, classes, and/or function groups referenced in the application source code) are not compiled at this time. To execute the application, the compilation units (as stored in storage module 132) are loaded into the program buffer 126. An interpreter 124 (which may be part of a virtual machine) then sequentially executes the statements contained in the compilation units (see operation 208), accessing the database tables 105 as needed. As dependent objects are encountered during runtime, the virtual machine checks for the existence of corresponding compilation units, and, if none are found, triggers the compilation of the dependent objects to create the requisite loads.

When an application is executed simultaneously by multiple users, the corresponding compilation units are loaded into the respective program buffer compartments (e.g., compartments 140, 141) for each user. To support hot deployment, the compilation units may be versioned, e.g., by including a version identifier in the name of the compilation units (or by other means). Thus, if one user is executing a particular application in a first version, the activation and compilation of a second, modified version of that application by another user does not affect the first user. While the second version of the compilation units resulting from compilation of the modified source code overwrites the first version of the compilation units as stored in storage module 132 within the database 104, execution of the application by the first user continues based on the first version of the compilation units as loaded into the program buffer compartment 140 associated with the first user's session. When a second user initiates execution of the compiled modified application, however, the second version of the compilation units is loaded from storage module 132 into the buffer compartment 141 associated with the second user's session. The first version of the compilation units may be deleted from the program buffer 126 when program execution is completed in all sessions that started the application prior to its modification.

The example method shown in FIG. 2 also illustrates how the use of database procedures can be integrated into the workflow for application creation and execution. In various example embodiments, the developer can embed database procedures directly into the application source code (operation 210) as "application-server-managed database procedures (ASMDPs)." The database procedures are encapsulated in special methods ("ASMDP methods") declared as database procedures, e.g., by virtue of a suitable tag (such as "by stored procedure" or "by database procedure" or "by database function"). The methods have a regular interface (like other methods written in the host language), as illustrated in the example code snippet in FIG. 3. The body of the method, however, is implemented in SQLScript, or, more generally, in the native database procedure language used by the database server 102. To support multiple database platforms, alternative example embodiments may employ, instead of the database-specific native procedure language, an OpenSQLScript language that is either limited to functionality common to multiple respective database procedure languages or properly mapped to database-specific features. The ASMDP methods may be methods of a regular class of the host language; for example, the class may include both regular methods and ASMDP methods. In some example embodiments, ASMDPs are required to be public and static; this may serve to avoid the complexity of mapping the concepts of object orientation and inheritance to database procedures.

Figure 3:
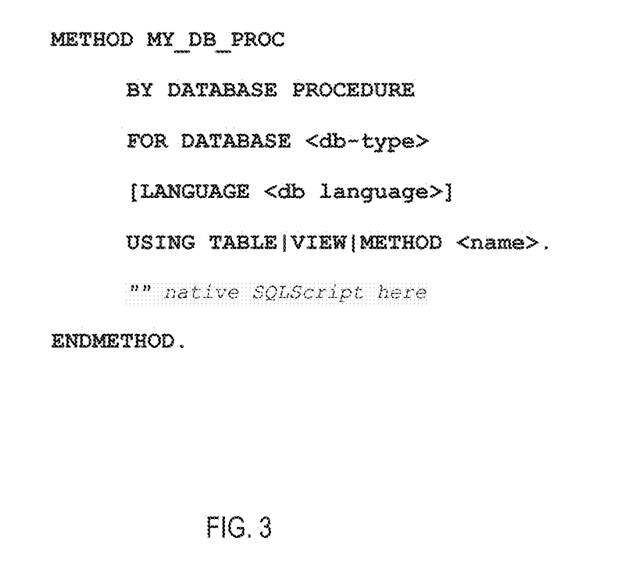
FIG. 3 is a code snippet illustrating a syntax for embedding database procedures in accordance with various example embodiments.

FIG. 3 is a code snippet illustrating a syntax for embedding database procedures in accordance with various example embodiments. In the example syntax shown in FIG. 3, the host application is written in ABAP. The interface includes "METHOD" followed by the method's name, the tag "BY DATABASE PROCEDURE," which marks the method as an ASMDP method (in the context of ABAP also referred to as an ABAP-managed database procedure (AMDP) method), a declaration of the database used by the procedure (e.g., the word "FOR" followed by the database name, e.g., HDB (for HANA)), a declaration of the database procedure language (e.g., SQLScript), and a declaration of the objects (e.g., tables, views, and methods) used in the database procedure (e.g., the word "USING" followed by the type of object that is being declared, followed by the name of that particular object). In some example embodiments, the declaration of the database procedure language is mandatory; in other example embodiments, it is optional, and a default language is assumed absent an explicit declaration. Similarly, the explicit forward declaration of the dependent objects may be mandatory or optional, depending on whether a reliable method for ascertaining dependent objects is available. The various declarations are followed by the body of the database procedure, written in the native database procedure language, and the closing bracket "ENDMETHOD."

Returning to the method shown in FIG. 2, in the course of checking the application source code, the embedded database procedures may be checked by exploiting inherent database functionality, in particular the SQLScript parser 110 on the database server 102. For this purpose, the parser 121 of the application server 100 may attempt to cause temporary runtime artifacts of the database procedure and its dependent objects (such as other database procedures and tables) to be created in the database catalog 136 (see operation 212) (e.g., by issuing a "create procedure" statement for execution by the DBMS 106); this attempt triggers (by virtue of the inherent database functionality) a syntax check by the SQLScript parser 110, and its success is contingent upon the syntactic correctness of the database procedure and its dependent objects.

In more detail, in accordance with one example embodiment, checking the database procedure for syntactic correctness may involve, first, identifying any dependent objects (including any dependent database procedures) used in the database procedure (see operation 212), either based on the forward declarations of dependent objects contained in the HMDP method itself or by using the well-known "get_procedure_objects" method (or a similar method). Thereafter, as shown at operation 213, temporary proxies of the identified dependent objects, or temporary "stubs" (which include the object name and signature, but omit, in the case of database procedures, the object body), are then created in the database catalog 136 (e.g., using the "create procedure" statement executed by the DBMS 106), provided they are syntactically correct. To avoid interference with any active versions of these objects, the proxies are created with different names. In case of multiple levels of dependencies (e.g., if dependent objects call further dependent objects), the objects are created in an order depending on their dependency level, beginning with the deepest level (e.g., with objects that do not have dependent objects themselves). Once proxies for all dependent objects have been successfully created, references to dependent objects in the body of the database procedure at issue are substituted for by references to the corresponding proxies, and the database procedure is then itself created in the database catalog 136 as shown in operation 214. Again, in the example embodiment, the database procedure is created under a different name to avoid confusion with any different, active version of the procedure. If the creation of the database procedure or any of its dependent objects is unsuccessful, an error message is sent to the parser 121 on the application server 100. Otherwise, the database procedure, including its dependencies, and the corresponding ASMDP method itself, can be assumed to be syntactically correct, and no errors are to be expected when it is called during later execution of the embedding host application. Following the syntax check, as shown in operation 215, the temporary database procedure and the temporary dependent-object proxies are deleted, or "dropped," in the database catalog 136 (e.g., using the "drop procedure" statement).

In various example embodiments, compilation of the application source code (see operation 206) does not immediately result in the creation of runtime database procedures. Rather, for each ASMDP, "create procedure" statements (hereinafter also referred to simply as "create statements") (as are well-known to those familiar with the SQL data description language (DDL)) may be generated in or in association with the compilation units (see operation 218); these create statements result, upon execution at a later time, in the creation of runtime objects in the database 104. (While semantically belonging to the compilation units, the DDL statements may be stored separately, with suitable references in the compilation units.) Specifically, in accordance with various example embodiments, two create statements are generated for each ASMDP: one statement to create the embedded database procedure itself, and one to create an associated procedure stub. During later execution of the compilation unit, the database procedure is not called directly, but indirectly via execution of the procedure stub. In this manner, the procedure stub serves as an entry point to accessing the database procedure.

Figure 4A:
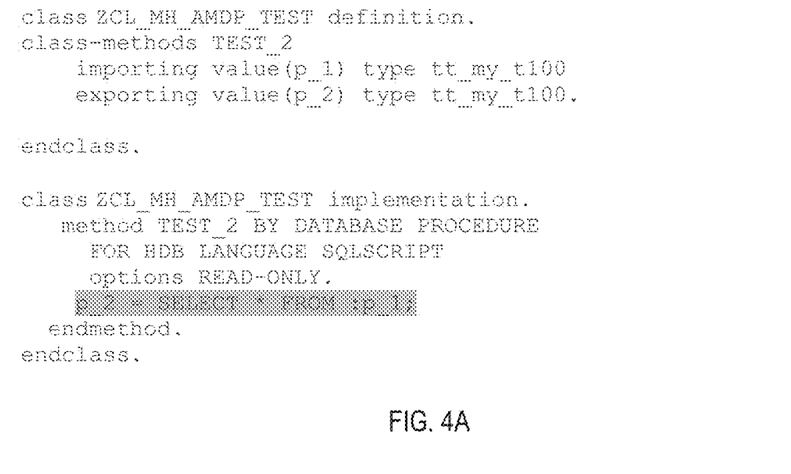
FIG. 4A is a code snippet illustrating a host-managed database procedure method in accordance with one example embodiment.
Figure 4B:
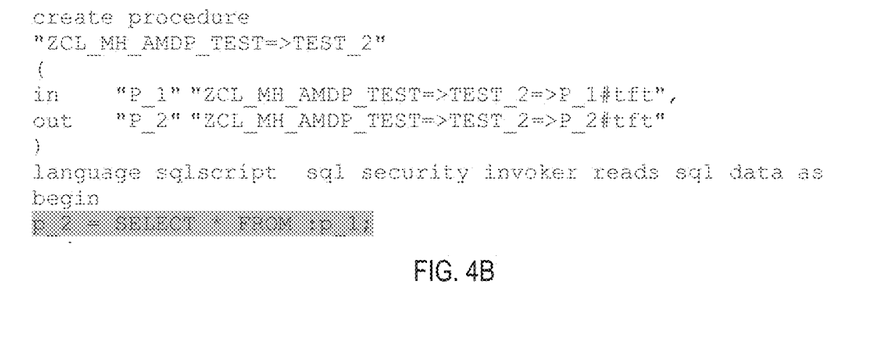
FIGS. 4B and 4C are code snippets illustrating create statements for the database procedure embedded in the method of FIG. 4A and for an associated procedure stub, respectively.
Figure 4C:
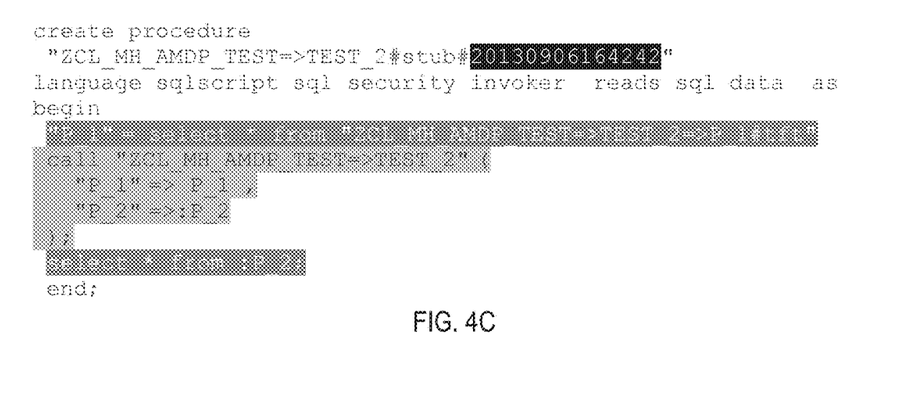

FIG. 4A is a code snippet illustrating an ASMDP method in accordance with one example embodiment; and FIGS. 4B and 4C are code snippets illustrating create statements for the database procedure embedded in the method of FIG. 4A and for an associated procedure stub, respectively. Specifically, in the example shown in FIGS. 4A-4C, the ASMDP is written in ABAP (and is, thus, an AMDP), and the embedded database procedure is written in SQLScript. In various example embodiments, the create statements are generated automatically from the AMDP source code (which does not itself distinguish between a database procedure and its procedure stub), e.g., using suitable functionality of the compiler 122. As shown, the create statement for the database procedure (shown in FIG. 4B) specifies the name, signature, and logic of the database procedure. The procedure logic is defined with the same code as specified in the AMDP method (shown in FIG. 4A), as can be seen by comparison of the highlighted portions of FIGS. 4A and 4B. The create statement for the procedure stub (shown in FIG. 4C) specifies the name of the stub and the signature, but not the logic, of the database procedure; instead, the procedure stub includes a call to the database procedure (highlighted in grey) and implements some parameter treatment for importing and exporting parameters (highlighted in dark grey). The procedure stub includes, e.g., as part of its name, a version identifier. In one example embodiment, the procedure stub is time-stamped with the date and time of compilation of the AMDP source code (see portion highlighted in black in FIG. 4C). Alternatively, the version identifier may be or include a number that increases with time, or another suitable combination of symbols that facilitates ordering procedure stubs based on the points in time at which they were created. In contrast to the procedure stub, the database procedure itself is not versioned.

Returning to the method shown in FIG. 2, in addition to generating the create statements for the database procedure and associated procedure stub, compilation of the application source code may involve checking whether any of the embedded database procedures and corresponding stubs already exist in the database catalog 136; if so, and if a comparison reveals that an embedded database procedure differs from the already existing one, at least the procedure stub for this database procedure (regardless of the version of this procedure stub), and optionally also the database procedure itself, is deleted from the database (e.g., using the "drop procedure" statement executed by the DBMS 106) (see operation 219) to prevent the use of outdated database procedures. If the database procedure itself is not deleted at the compilation stage, it will be deleted later, during execution of the compilation unit, prior to creation of the new database procedure version. Furthermore, in example embodiments where the create statements are stored separately from the compilation units in a repository of DDL statements, the create statement(s) for the deleted database procedure stub may likewise be deleted (preventing renewed creation of the deleted version of the procedure stub at a later time).

When, during later execution of the compilation unit(s) (at operation 208) by the interpreter 124 of the application server 100, an ASMDP is called, an attempt at its execution is made by calling the associated procedure stub. This attempt results in a specific error if the called database procedure stub does not yet exist (as is the case upon first-time execution of the compilation unit), triggering the creation or "activation" of the procedure stub and the database procedure (as well as of any not yet existing dependent procedures or other objects) in the catalog 136 based on the stored DDL statements (see operation 220). Creation of the procedure stub and database procedure is followed by execution of the procedure stub directly in the database 104 (see operation 222), which in turn results, via a call from the stub to the database procedure, in the execution of the database procedure directly in the database (see operation 223). Thus, the database procedure and stubs for ASMDPs are generally created at the latest upon being called during first-time execution of the compilation unit(s) by the interpreter 124. Thereafter, the already existing procedure stubs (of the correct version) and database procedures are used. The interpreter 124 (or the virtual machine of which it is a part) may keep track of the creation of any database procedures and stubs, and throw an exception (e.g., abort execution of the program and/or notify the user) when a previously created procedure stub is suddenly missing, as may be the case when a new version of the database procedure has been deployed by another user during execution of the application. In some embodiments, the deletion of a previously created database procedure stub is detected based on the deletion of the corresponding create statement from the repository of DDL statements.

Execution of the database procedures is generally based on their respective entries in the database catalog 136, and can be accomplished with conventional database means (represented in FIG. 1 by the SQLScript Compiler/Interpreter 112), which may vary from database to database. In some example embodiments, the database procedures undergo a compilation process (e.g., as part of their activation in the catalog 136) that results in separately stored runtime artifacts. In other example embodiments, the database procedures are interpreted (as the term is understood by those of ordinary skill in the art). Combinations of compilation and interpretation are also possible.

Figure 5:
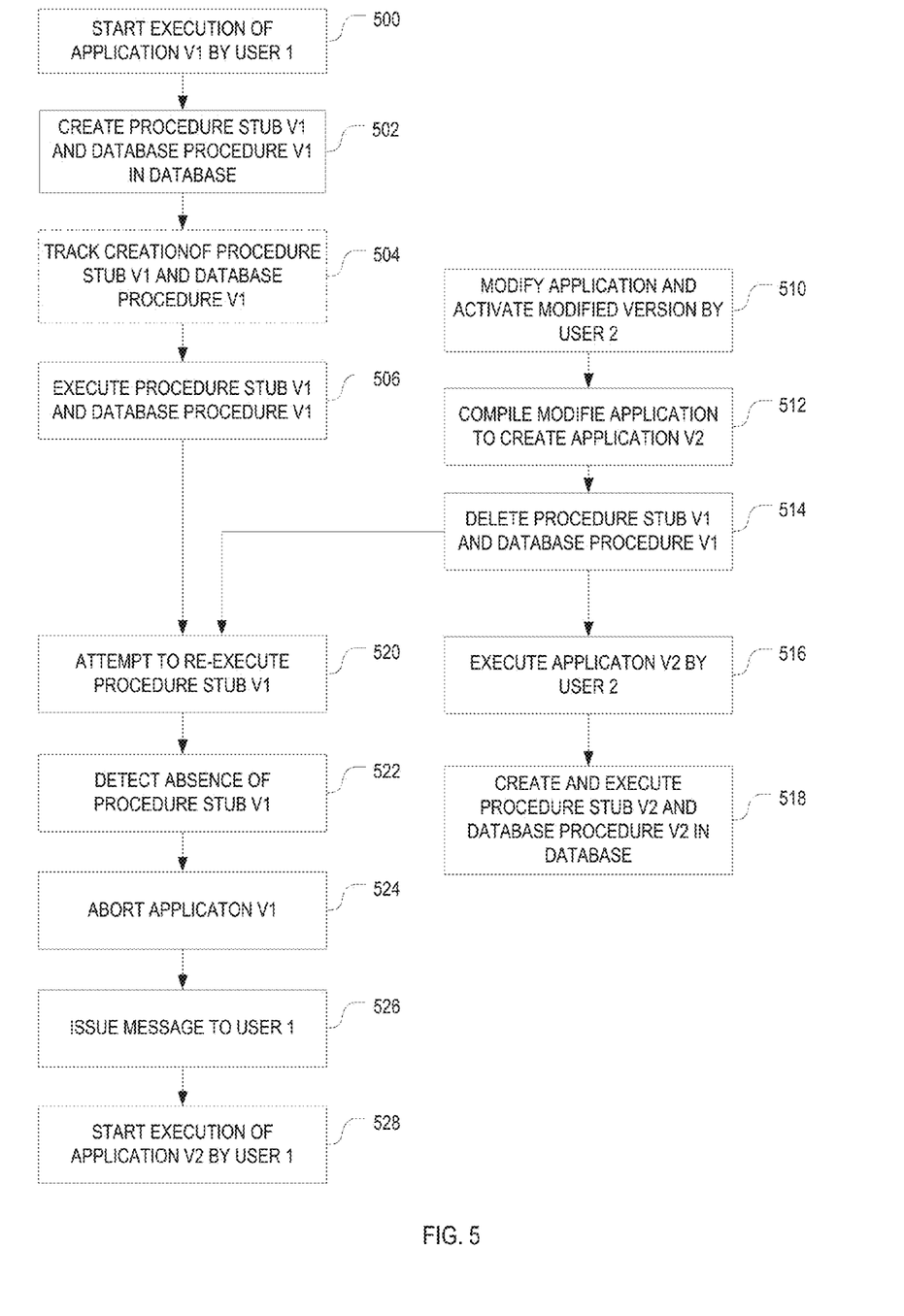
FIG. 5 is a flow chart illustrating a method, in accordance with an example embodiment, for hot deployment of a new version of and application with an embedded database procedure in parallel with the execution of a prior version of that application.

FIG. 5 is a flow chart illustrating a method, in accordance with an example embodiment, for hot deployment of a new version of an application with an embedded database procedure in parallel with the execution of a prior version of that application. As shown, a first user ("user 1") may begin execution of a first version of an application with an embedded database procedure (more precisely, of the compilation units resulting from compilation of the application, which include create statements for the database procedure and associated procedure stub) in a first user session (see operation 500). When the interpreter or virtual machine 124 executing the application encounters the embedded database procedure for the first time, it causes creation of first versions of the procedure stub and the database procedure itself in the database catalog 136 (see operation 502). In some example embodiments, the virtual machine also and makes note of the creation of these database procedure and stub versions (e.g., by setting the value of a suitable tracking variable) (see optional operation 504). As explained above, the procedure stub includes a version identifier, such as, e.g., a time stamp indicative of a time of compilation of the application. Execution of the application includes execution of the procedure stub, which calls, and thereby triggers execution of, the database procedure (see operation 506).

As indicated at operation 510, a second user ("user 2") may now modify and activate the source code of the host application, including the embedded database procedure. In example embodiments, the activation (which may be achieved, e.g., by clicking on or otherwise selecting a user-interface element included in the source code editor) automatically triggers compilation of the modified source code (at operation 512), resulting in a second version of the host application, with corresponding second versions of the create statements for the database procedure and stub. Compilation of the modified application further results in deletion of the first version of the procedure stub and/or the database procedure from the database (indicated at operation 514), and, in some example embodiments, of the corresponding create statements. If user 2 (or another user establishing a new user session) now executes this second, modified version of the application at operation 516, the virtual machine 124, not finding the procedure stub for version 2 in the database, will simply create the second version stub as well as the second version of the database procedure in the database catalog 136, and cause their execution (see operation 518).

By contrast, if the first user session, in which the first version of the application was started at operation 500, returns to the embedded database procedure—which, in the compilation units used in session 1, still exists in its first version—an attempt to re-execute the first procedure stub at operation 520 will result in an error, since that procedure stub no longer exists in the database. The virtual machine 124, detecting the inconsistency (at operation 522) based, e.g., on its tracking of the creation of the procedure stub in operation 504 or on the missing create statement for the procedure stub, may abort execution of the application (at operation 524) to avoid the use of inconsistent database procedures during one session. (Note that this scenario need not always materialize. In many instances, the program running in session 1 will not return to the database procedure following modification thereof by user 2, and session 1 may be completed without disruption by the modification.) Alternatively or additionally, the virtual machine 124 may issue a warning or message to the user (at operation 526), e.g., informing the user that the previously employed database procedure version no longer exists and/or indicating that a new version is available. User 1 then has the option to re-execute the application from the start (see operation 528), which will automatically result in the use of the second database procedure version (unless, of course, a further modification has been deployed in the meantime).

Database procedures can have dependencies to other database artifacts (e.g., views, other procedures, etc.). A pre-requisite to creating a procedure is that all entities that are consumed by the procedure already exist. This leads to a dependency chain that is to be observed in the procedure lifecycle management. For hot-deployment support, a dictionary of all procedures (including DDL statements for drop and create) and their dependencies may be introduced. This dependency management may be used during deployment of a new procedure version to effect that only the required database objects get updated. For example, database procedures are frequently called from within other database procedures. In some example embodiments, this may be accomplished by a two-step process including a call, from within a first data procedure, to a procedure stub associated with a second database procedure, which then calls the second database procedure itself. In this case, if the second database procedure is modified, the compilation process will remove any prior version of the stub for that procedure that may have been created in the database. A call from the first database procedure to the prior version of the second procedure stub will then result in an error and/or abortion of the application calling the first database procedure, avoiding inconsistencies. In other example embodiments, however, the first database procedure calls the second database procedure directly (rather than indirectly via a procedure stub). This can result in the execution of two different versions of the second database procedure during execution of an application using the first database procedure. To avoid such inconsistencies, the compiler may be configured to cause, upon activation and compilation of the modified application including a new version the second database procedure, not only deletion of any prior version of the second database procedure and its associated stub from the database, but also identification and deletion of any existing versions of other database procedures (such as the first database procedure) calling the second database procedure. An attempt at executing the first database procedure will then result in an error, letting the user know that the first database procedure or a dependent object thereof has been modified.

Databases generally show different behavior for a procedure when a used artifact (e.g., a database view) is dropped and recreated. In some cases, the procedure fails to become valid again, or has other semantic problems (e.g., usage of SELECT *). For hot-deployment support, the infrastructure may be designed to be fault-tolerant. Exceptions happening at the procedure call may be analyzed with the procedure lifecycle state. If this state is not proper, the procedure (and optionally all dependent artifacts) may be recreated and the execution be repeated. This fault tolerance reduces manual interaction and increases availability.

Accordingly, various example embodiments facilitate the embedding of database procedures directly in host application source code, as well as the hot deployment of modified versions of the host application, including modified database procedures. Facilitating the incorporation of database procedures, written in the native database language, into database-accessing software applications (such as, e.g., ABAP programs) eliminates the need for application developers to generate program code objects with two separate development tools (such as, e.g., one for ABAP and one for the database procedures), which may involve login under two separate user accounts, and the cumbersome task of manually creating interfaces and mapping data types between these program code objects. Moreover, the present framework for integrating database procedures into a host language is robust with regard to any changes to syntax of the database procedure language, as the parsing and execution of the database procedure remains the responsibility of the database itself.

The ability to deploy application updates while an application is in use can speed up application development in scenarios where many developers work on the same application as a team, and render updates available to end-users sooner. At the same time, the systems and methods described herein avoid or at least minimize inconsistencies in embedded database procedures used by an updated application, as users may be alerted to a change in an employed embedded database procedure by virtue of a direct notification and/or abortion of the application. Since the creation of database procedures in the database catalog can be a time-consuming process, various example embodiments utilize "lazy" creation, by which new versions of database procedures are not created until executed, and compilation of the source code of a modified database procedure merely triggers deletion of previous database procedure (and stub) versions (which is generally a much faster operation). In general, an infrastructure providing hot-deployment support in accordance herewith may differentiate between eager actions (drop of versioned procedure stubs), lazy actions (creation of procedures), and deferred actions (cleanup of obsolete artifacts). All of these measures reduce contention and overhead, and allow for a flexible procedure lifecycle management.

Modules, Components, and Logic

Certain example embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some example embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an application-specific integrated circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering example embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In example embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Software Architecture

Figure 6:
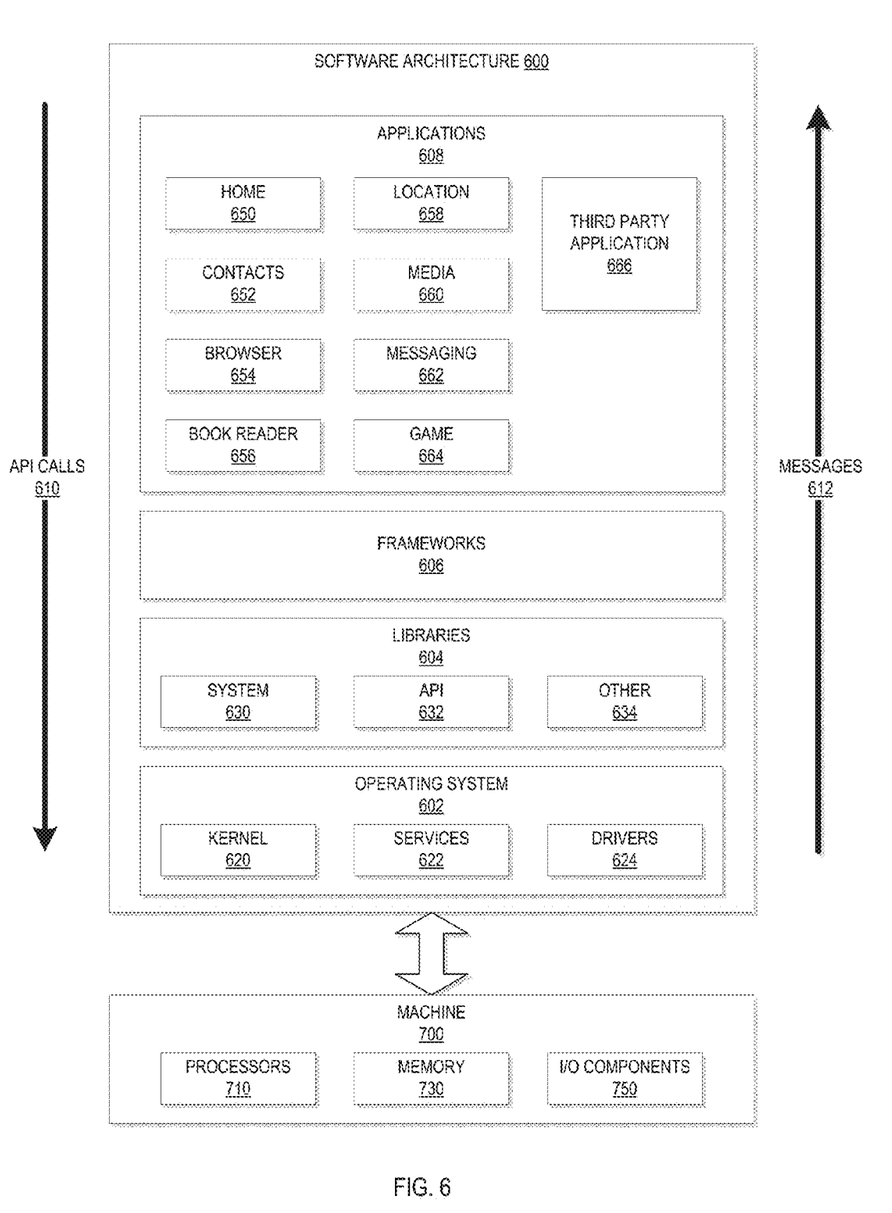
FIG. 6 is a block diagram illustrating a software architecture, in accordance with an example embodiment, that may be installed on a machine.

FIG. 6 is a block diagram illustrating an architecture of software 600, portions or the entirety of which may be installed on one or more of the application server 100 and/or the database server 102 depicted in FIG. 1. FIG. 6 is merely a non-limiting example of a software architecture and it will be appreciated that many other architectures may be implemented to facilitate the functionality described herein. The software 600 may be executing on hardware such as machine 700 of FIG. 7 that includes processors 710, memory 730, and I/O components 750. In the example architecture of FIG. 6, the software 600 may be conceptualized as a stack of layers where each layer may provide particular functionality. For example, the software 600 may include layers such as an operating system 602, libraries 604, frameworks 606, and applications 608. Operationally, the applications 608 may invoke application programming interface (API) calls 610 through the software stack and receive messages 612 in response to the API calls 610.

The operating system 602 may manage hardware resources and provide common services. The operating system 602 may include, for example, a kernel 620, services 622, and drivers 624. The kernel 620 may act as an abstraction layer between the hardware and the other software layers. For example, the kernel 620 may be responsible for memory management, processor management (e.g., scheduling), component management, networking, security settings, and so on. The services 622 may provide other common services for the other software layers. The drivers 624 may be responsible for controlling and/or interfacing with the underlying hardware. For instance, the drivers 624 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 604 may provide a low-level common infrastructure that may be utilized by the applications 608. The libraries 604 may include system libraries 630 (e.g., C standard library) that may provide functions such as memory allocation functions, string manipulation functions, mathematic functions, and the like. In addition, the libraries 604 may include API libraries 632 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 604 may also include a wide variety of other libraries 434 to provide many other APIs to the applications 608.

The frameworks 606 may provide a high-level common infrastructure that may be utilized by the applications 608. For example, the frameworks 606 may provide various graphic user interface (GUI) functions, high-level resource management, high-level location services, and so forth. The frameworks 606 may provide a broad spectrum of other APIs that may be utilized by the applications 608, some of which may be specific to a particular operating system or platform.

The applications 608 include a home application 650, a contacts application 652, a browser application 654, a book reader application 656, a location application 658, a media application 660, a messaging application 662, a game application 664, and a broad assortment of other applications such as third-party application 666. In a specific example, the third-party application 666 (e.g., an application developed using the Android™ or iOS™ software development kit (SDK) by an entity other than the vendor of the particular platform) may be mobile software running on a mobile operating system such as iOS™, Android™ Windows® Phone, or other mobile operating systems. In this example, the third party application 666 may invoke the API calls 610 provided by the mobile operating system 602 to facilitate functionality described herein.

Example Machine Architecture and Machine-Readable Medium

Figure 7:
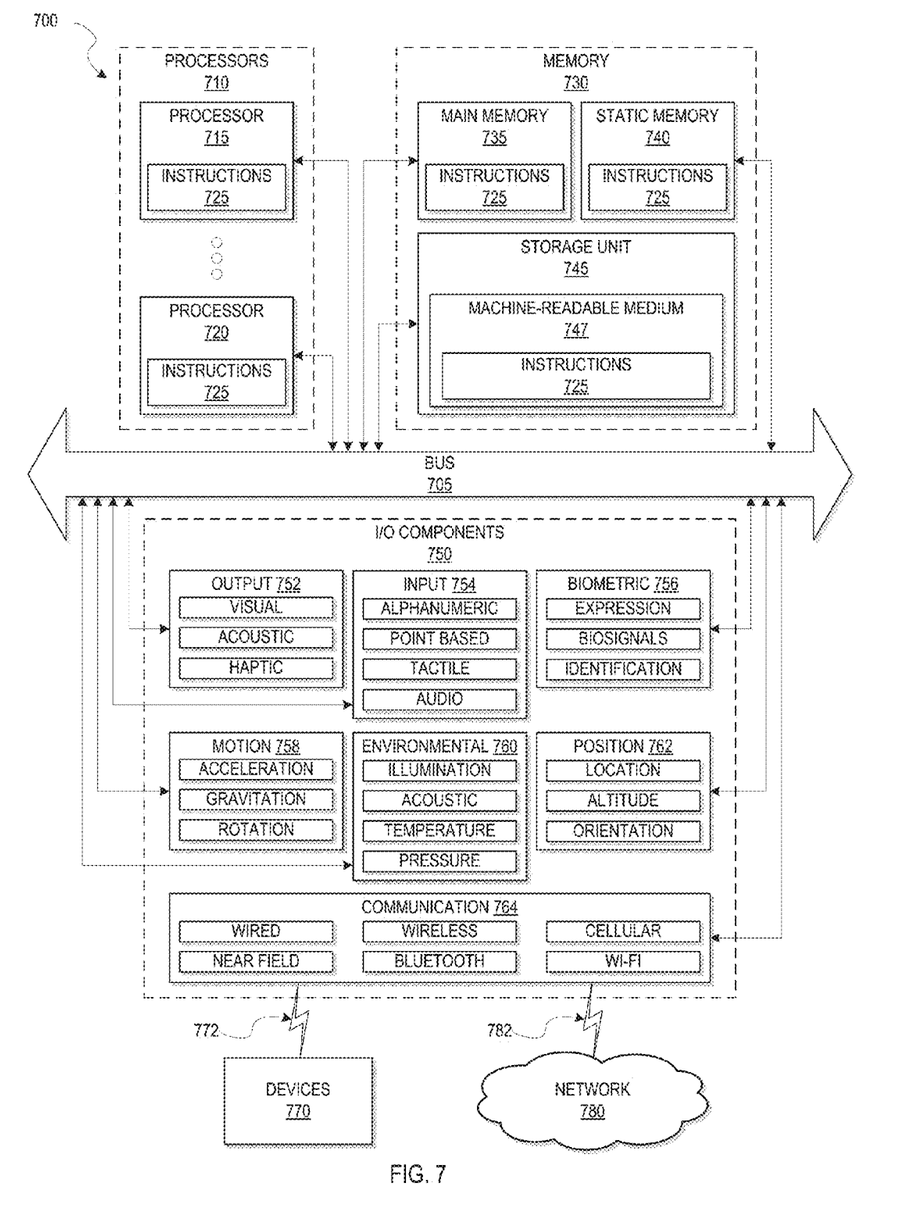
FIG. 7 is a diagrammatic representation of a machine in the form of a computer system within which a set of instructions may be executed for causing the machine to perform any one or more of the methodologies discussed herein.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 725 (e.g., software, a program, an application, an applet, an app, or other executable code) for causing the machine 700 to perform any one or more of the methodologies discussed herein may be executed. In alternative example embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but be not limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 725, sequentially or otherwise, that specify actions to be taken by machine 700. Further, while only a single machine 700 is illustrated, the term "machine" shall also be taken to include a collection of machines 700 that individually or jointly execute the instructions 725 to perform any one or more of the methodologies discussed herein.

The machine 700 may include processors 710, memory 730, and I/O components 750, which may be configured to communicate with each other via a bus 705. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 715 and processor 720 that may execute instructions 725. The term "processor" is intended to include multi-core processor that may comprise two or more independent processors (also referred to as "cores") that may execute instructions contemporaneously. Although FIG. 7 shows multiple processors 710, the machine 700 may include a single processor with a single core, a single processor with multiple cores (e.g., a multi-core process), multiple processors with a single core, multiple processors with multiples cores, or any combination thereof.

The memory 730 may include a main memory 735, a static memory 740, and a storage unit 745 accessible to the processors 710 via the bus 705. The storage unit 545 may include a machine-readable medium 747 on which are stored the instructions 725 embodying any one or more of the methodologies or functions described herein. The instructions 725 may also reside, completely or at least partially, within the main memory 735, within the static memory 740, within at least one of the processors 710 (e.g., within a processor's cache memory), or any suitable combination thereof, during execution thereof by the machine 700. Accordingly, the main memory 735, static memory 740, and the processors 710 may be considered as machine-readable media 747.

As used herein, the term "memory" refers to a machine-readable medium 747 able to store data temporarily or permanently and may be taken to include, but not be limited to, random-access memory (RAM), read-only memory (ROM), buffer memory, flash memory, and cache memory. While the machine-readable medium 747 is shown in an example embodiment to be a single medium, the term "machine-readable medium" should be taken to include a single medium or multiple media (e.g., a centralized or distributed database, or associated caches and servers) able to store instructions 725. The term "machine-readable medium" shall also be taken to include any medium, or combination of multiple media, that is capable of storing instructions (e.g., instructions 725) for execution by a machine (e.g., machine 700), such that the instructions, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 750 may include a wide variety of components to receive input, provide and/or produce output, transmit information, exchange information, capture measurements, and so on. It will be appreciated that the I/O components 750 may include many other components that are not shown in FIG. 7. In various example embodiments, the I/O components 750 may include output components 752 and/or input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, and/or other pointing instrument), tactile input components (e.g., a physical button, a touch screen that provides location and force of touches or touch gestures, and/or other tactile input components), audio input components (e.g., a microphone), and the like.

In further example embodiments, the I/O components 750 may include biometric components 756, motion components 758, environmental components 760, and/or position components 762 among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, finger print identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), and/or other components that may provide indications, measurements, and/or signals corresponding to a surrounding physical environment. The position components 762 may include location sensor components (e.g., a Global Position System (GPS) receiver component), altitude sensor components (e.g., altimeters and/or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 and/or devices 770 via coupling 782 and coupling 772 respectively. For example, the communication components 764 may include a network interface component or other suitable device to interface with the network 780. In further examples, communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine and/or any of a wide variety of peripheral devices (e.g., a peripheral device couple via a Universal Serial Bus (USB)).

Moreover, the communication components 764 may detect identifiers and/or include components operable to detect identifiers. For example, the communication components 764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), acoustic detection components (e.g., microphones to identify tagged audio signals), and so on. In additional, a variety of information may be derived via the communication components 764, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 780 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or other type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 725 may be transmitted and/or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 725 may be transmitted and/or received using a transmission medium via the coupling 772 (e.g., a peer-to-peer coupling) to devices 770. The term "transmission medium" shall be taken to include any intangible medium that is capable of storing, encoding, or carrying instructions 725 for execution by the machine 700, and includes digital or analog communications signals or other intangible media to facilitate communication of such software.

Furthermore, the machine-readable medium 747 is non-transitory (in other words, not having any transitory signals) in that it does not embody a propagating signal. However, labeling the machine-readable medium 747 as "non-transitory" should not be construed to mean that the medium is incapable of movement; the medium should be considered as being transportable from one physical location to another. Additionally, since the machine-readable medium 747 is tangible, the medium may be considered to be a machine-readable device.

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The example embodiments illustrated herein are described in sufficient detail to enable those skilled in the art to practice the teachings disclosed. Other example embodiments may be used and derived therefrom, such that structural and logical substitutions and changes may be made without departing from the scope of this disclosure. The Detailed Description, therefore, is not to be taken in a limiting sense, and the scope of various example embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various example embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of example embodiments of the present disclosure as represented by the appended claims. The specification and drawings are, accordingly, to be regarded in an illustrative rather than a restrictive sense.

The invention claimed is:

1. A method for deployment of a modification to a database procedure embedded in a database-accessing host application during execution of the host application, the method comprising:
executing, in a first user session, a first version of the host application including a first version of an embedded database procedure, thereby creating and executing first versions of the database procedure and of an associated procedure stub in a database accessed by the host application, the first version of the procedure stub including a version identifier; and
during execution of the first version of the host application, compiling, in a second user session, modified source code for the host application, including a modification to the embedded database procedure, to create a second version of the host application including a second version of the host application including a second version of the embedded database procedure, thereby causing deletion of the first version of the procedure stub from the database.

2. The method of claim 1, further comprising, after compiling the modified source code, attempting execution, in the first user session, of the first version of the procedure stub, thereby causing an exception resulting from absence of the first version of the procedure stub from the database.

3. The method of claim 2, further comprising, in response to the exception, aborting execution of the host application in the first user session.

4. The method of claim 2, further comprising, in response to the exception, issuing a message indicating availability of the second version of the database procedure.

5. The method of claim 1, wherein compiling the modified source code further causes deletion of the first version of the database procedure from the database.

6. The method of claim 1, wherein compiling the modified source code comprises generating create statements for second versions of the database procedure and an associated procedure stub, the second version of the procedure stub including a second version identifier.

7. The method of claim 6, further comprising executing the second version of the host application, thereby creating, based on the generated create statements, second versions of the database procedure and the associated procedure stub in the database.

8. The method of claim 7, wherein executing the second version of the host application comprises executing the second version of the procedure stub, thereby calling the second version of the database procedure.

9. The method of claim 7, wherein creation of the second version of the database procedure comprises deleting the first version of the database procedure.

10. The method of claim 6, wherein the second version identifier is based on a time of compilation of modified source code.

11. The method of claim 1, wherein the host application is written in an Advanced Business Application Programming (ABAP) language.

12. The method of claim 11, wherein the embedded database procedure is encapsulated in an ABAP-managed database procedure method.

13. The method of claim 1, wherein source code for the embedded database procedure is written in SQLScript or LLANG.

14. The method of claim 1, further comprising, prior to compiling the modified source code for the host application, performing a syntax check of the modified embedded database procedures by temporarily creating the embedded database procedures in the database, whereby the database procedure is parsed by a parser specific to a native database procedure language associated with the database.

15. An application server comprising:
at least one processor; and
memory storing sets of instructions for execution by the at least one processor, the sets of instructions comprising:
a virtual machine configured to support parallel execution of multiple versions of a host application with an embedded database procedure in multiple respective user sessions, execution of the database procedure embedded in a first version of the application comprising creation and execution of first versions of the database procedure and of an associated procedure stub in a database accessed by the host application; and
a compiler configured to cause deletion of the first version of the procedure stub from the database upon compilation, during execution of the first version of the host application, of a second version of the host application including a second version of the database procedure.

16. The application server of claim 15, wherein the compiler is further configured to create, from source code for the host application and the embedded database procedure, one or more compilation units comprising create statements for the database procedure and the associated procedure stub, the procedure stub including a version identifier that is based on a time of compilation.

17. The application server of claim 15, wherein the procedure stub is configured to call, upon execution, the database procedure.

18. The application server of claim 15, wherein the virtual machine is further configured to detect, upon an attempt to execute the first version of the procedure stub following compilation of the second version of the host application, absence of the first version of the procedure stub from the database.

19. The application server of claim 18, wherein the virtual machine is further configured to at least one of abort execution of the host application in the first user session or issue a message indicating availability of the second version of the database procedure in response to detecting the absence of the first version of the procedure stub from the database.

20. The application server of claim 15, wherein the sets of instructions further comprise a source-code editor for defining source code of the host application in an application programming language and for further defining source code of the embedded database procedures in a database-procedure language.

21. A non-transitory machine-readable medium storing instructions which, when executed by one or more processors of a machine, cause the machine to perform operations comprising:

executing, in a first user session, a first version of a host application including a first version of an embedded database procedure, thereby creating and executing first versions of the database procedure and of an associated procedure stub in a database accessed by the host application, the first version of the procedure stub including a version identifier; and     during execution of the first version of the host application, compiling, in a second user session, modified source code for the host application, including a modification to the embedded database procedure, to create a second version of the host application including a second version of the host application including a second version of the embedded database procedure, thereby causing deletion of the first version of the procedure stub from the database.

\* \* \* \* \*